(12) United States Patent
Volvovski et al.

(10) Patent No.: US 10,831,600 B1
(45) Date of Patent: Nov. 10, 2020

(54) ESTABLISHING AN OPERATION EXECUTION SCHEDULE IN A STORAGE NETWORK

(71) Applicant: Pure Storage, Inc., Mountain View, CA (US)

(72) Inventors: Ilya Volvovski, Chicago, IL (US); Bruno H. Cabral, Chicago, IL (US); Manish Motwani, Chicago, IL (US); Thomas D. Cocagne, Elk Grove Village, IL (US); Timothy W. Markison, Mesa, AZ (US); Gary W. Grube, Barrington Hills, IL (US); Wesley B. Leggette, Chicago, IL (US); Jason K. Resch, Chicago, IL (US); Michael C. Storm, Palo Alto, CA (US); Greg R. Dhuse, Chicago, IL (US); Yogesh R. Vedpathak, Chicago, IL (US); Ravi V. Khadiwala, Bartlett, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 16/854,010

(22) Filed: Apr. 21, 2020

Related U.S. Application Data

(63) Continuation of application No. 16/108,905, filed on Aug. 22, 2018, now abandoned, which is a
(Continued)

(51) Int. Cl.
*G06F 11/16* (2006.01)
*G06F 9/50* (2006.01)
*G06F 11/10* (2006.01)
*G06F 3/06* (2006.01)
*H04L 29/08* (2006.01)
(Continued)

(52) U.S. Cl.
CPC .......... *G06F 11/1076* (2013.01); *G06F 3/061* (2013.01); *G06F 3/067* (2013.01);
(Continued)

(58) Field of Classification Search
CPC .... G06F 11/0709; G06F 3/067; G06F 3/0659; G06F 9/50; G06F 9/5005; G06F 9/5044;
(Continued)

(56) References Cited

U.S. PATENT DOCUMENTS 4,092,732 A  5/1978 Ouchi
5,278,838 A  1/1994 Ng et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Joseph O Schell
(74) *Attorney, Agent, or Firm* — Garlick & Markison; Timothy W. Markison; Bruce E. Stuckman

(57) ABSTRACT

A method for execution by a dispersed storage and task (DST) execution unit includes identifying a plurality of pending operations. A resource availability level to support execution of at least one of the plurality of pending operations is determined, and a required resource level to execute the at least one of the plurality of pending operations is determined. A balance factor between at least two types of the plurality of pending operations is determined based on the resource availability level and the required resource level. Determination of required timing of the execution of the at least one of the plurality of pending operations is coordinated with at least one other DST execution unit. An operation execution schedule is updated based on the required resource levels, the resource availability level, the balance factor, and the required timing of the execution.

20 Claims, 6 Drawing Sheets

Related U.S. Application Data continuation-in-part of application No. 15/400,767, filed on Jan. 6, 2017, now Pat. No. 10,102,069, which is a continuation of application No. 14/680,459, filed on Apr. 7, 2015, now Pat. No. 9,606,867.

(60) Provisional application No. 62/008,207, filed on Jun. 5, 2014.

(51) Int. Cl.
*G06F 11/07* (2006.01)
*G06F 16/00* (2019.01)
*H04L 12/911* (2013.01)
*H04L 12/841* (2013.01)

(52) U.S. Cl.
CPC .......... *G06F 3/0635* (2013.01); *G06F 3/0659* (2013.01); *G06F 11/0709* (2013.01); *G06F 11/0727* (2013.01); *G06F 11/0775* (2013.01); *G06F 16/00* (2019.01); *H04L 47/72* (2013.01); *H04L 67/1097* (2013.01); *H04L 67/325* (2013.01); *G06F 9/50* (2013.01); *G06F 9/5005* (2013.01); *G06F 9/5077* (2013.01); *G06F 2211/1004* (2013.01); *G06F 2211/1028* (2013.01); *H04L 47/28* (2013.01)

(58) Field of Classification Search
CPC ...... G06F 9/505; G06F 9/5072; G06F 9/5077; H04L 67/325; H04L 67/10; H04L 67/1097; H04L 47/28; H04L 47/62; H04L 47/50; H04L 47/521; H04L 47/92
See application file for complete search history.

(56) References Cited

U.S. PATENT DOCUMENTS

| | | | |
|---|---|---|---|
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1* | 3/2002 | Katsandres | G06F 9/547 709/203 |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,454,566 B1 | 11/2008 | Overby | |
| 7,636,724 B2 | 12/2009 | de la Torre et al. | |
| 8,014,418 B2* | 9/2011 | Shankara | H04L 47/50 370/459 |
| 8,250,257 B1 | 8/2012 | Harel et al. | |
| 8,589,625 B2* | 11/2013 | Colgrove | G06F 3/0688 711/114 |
| 8,782,211 B1* | 7/2014 | Sharma | H04L 67/325 709/224 |
| 10,326,610 B2* | 6/2019 | Ireland | H04W 4/80 |
| 2002/0062422 A1 | 5/2002 | Butterworth et al. | |
| 2002/0161972 A1 | 10/2002 | Talagala et al. | |
| 2002/0166079 A1 | 11/2002 | Ulrich et al. | |
| 2002/0194526 A1 | 12/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0126244 A1* | 7/2003 | Smith | H04L 67/325 709/223 |
| 2003/0161316 A1* | 8/2003 | Kramer | H04L 47/50 370/395.4 |
| 2004/0024963 A1 | 2/2004 | Talagala et al. | |
| 2004/0122917 A1 | 6/2004 | Menon et al. | |
| 2004/0153567 A1* | 8/2004 | Lichtenstein | H04L 67/322 709/235 |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2005/0240792 A1 | 10/2005 | Sicola et al. | |
| 2006/0047907 A1 | 3/2006 | Shiga et al. | |
| 2006/0129771 A1 | 6/2006 | Dasgupta et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0037656 A1 | 2/2009 | Suetsugu et al. | |
| 2009/0094251 A1 | 4/2009 | Gladwin et al. | |
| 2009/0094318 A1 | 4/2009 | Gladwin et al. | |
| 2010/0005237 A1* | 1/2010 | Bougaev | G06F 11/3058 711/111 |
| 2010/0023524 A1 | 1/2010 | Gladwin et al. | |
| 2011/0202732 A1 | 8/2011 | Montgomery | |
| 2013/0191843 A1* | 7/2013 | Sarkar | G06F 9/505 718/105 |
| 2014/0278496 A1* | 9/2014 | Spencer | G06F 11/3442 705/2 |
| 2015/0200833 A1 | 7/2015 | Cutforth et al. | |
| 2016/0179618 A1* | 6/2016 | Resch | G06F 21/80 714/764 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Confer-

(56) References Cited

OTHER PUBLICATIONS ence on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

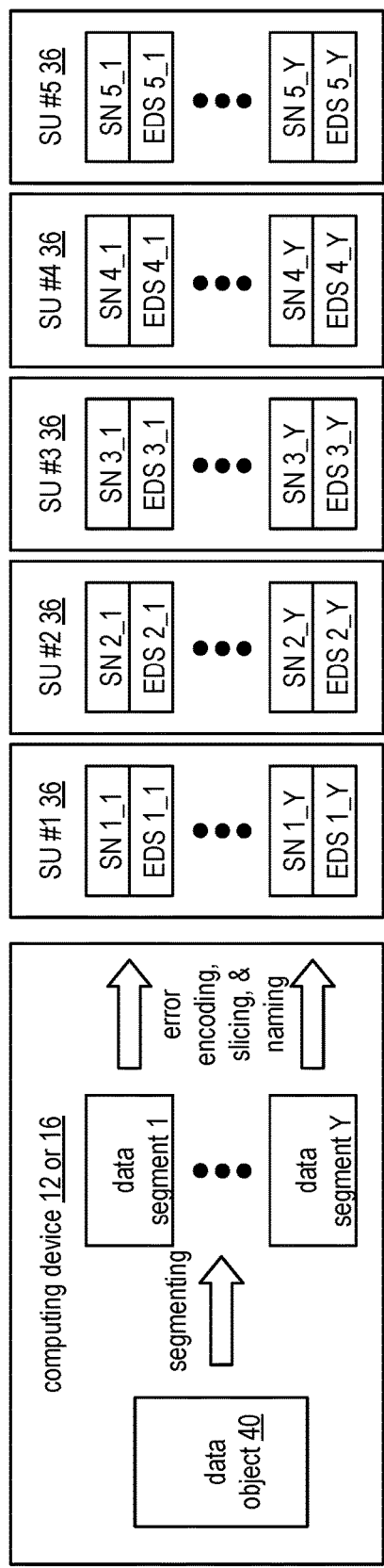
FIG. 3
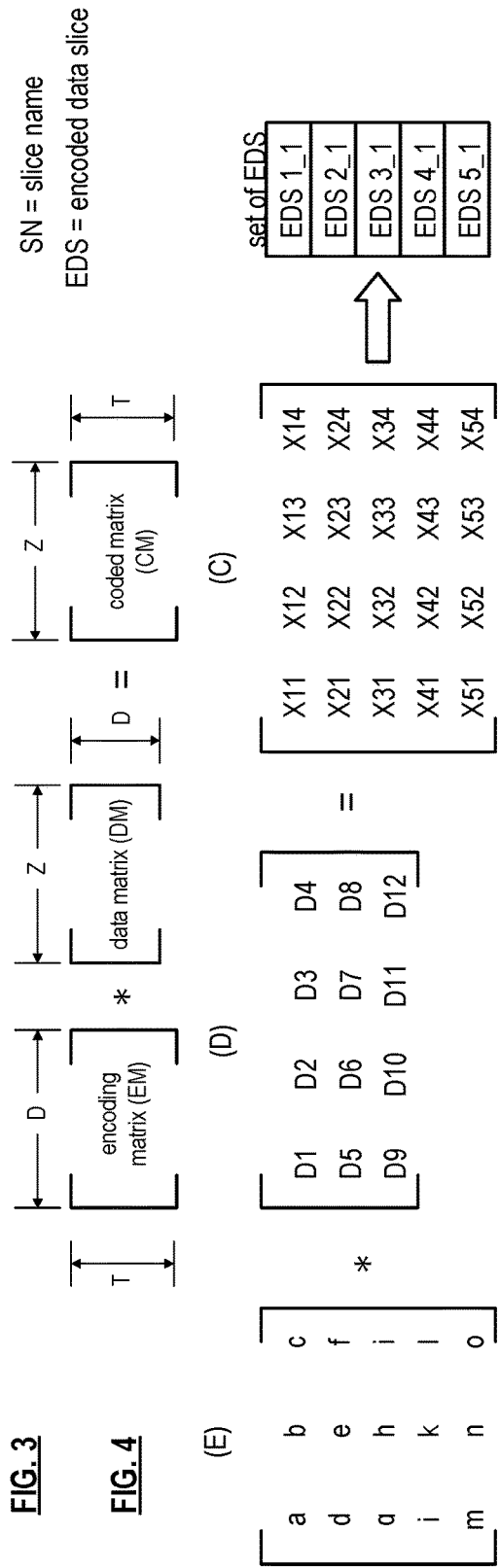
FIG. 4
FIG. 5
FIG. 6

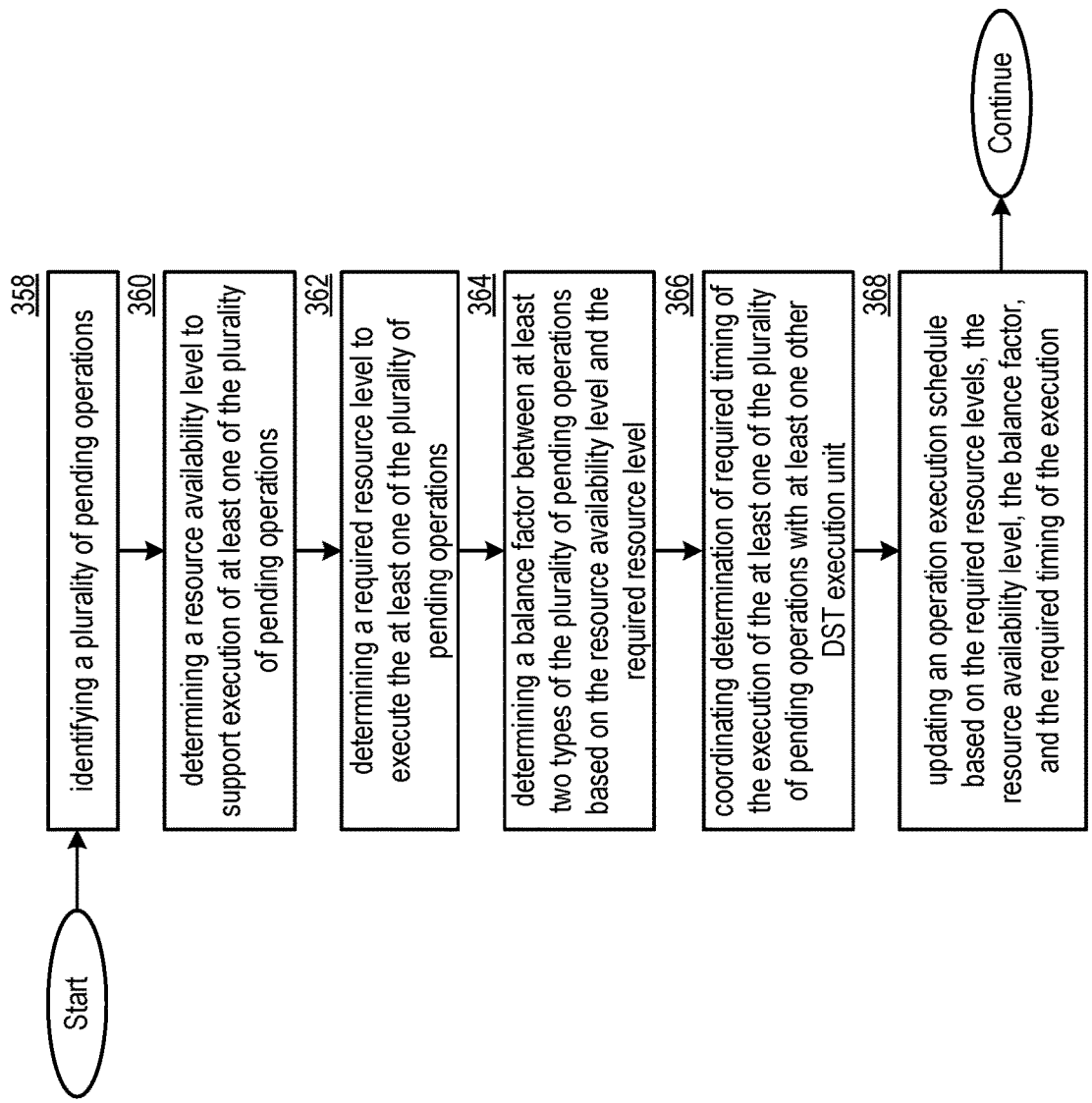

ESTABLISHING AN OPERATION EXECUTION SCHEDULE IN A STORAGE NETWORK

CROSS-REFERENCE TO RELATED APPLICATIONS

The present U.S. Utility Patent Application claims priority pursuant to 35 U.S.C. § 120 as a continuation of U.S. Utility application Ser. No. 16/108,905, entitled "ESTABLISHING AN OPERATION EXECUTION SCHEDULE IN A DISPERSED STORAGE NETWORK", filed Aug. 22, 2018, which is a continuation-in-part of U.S. Utility application Ser. No. 15/400,767, entitled "MAINTAINING DATA STORAGE IN ACCORDANCE WITH AN ACCESS METRIC", filed Jan. 6, 2017, issued as U.S. Pat. No. 10,102,069 on Oct. 16, 2018, which is a continuation of U.S. Utility application Ser. No. 14/680,459, entitled "MAINTAINING DATA STORAGE IN ACCORDANCE WITH AN ACCESS METRIC", filed Apr. 7, 2015, issued as U.S. Pat. No. 9,606,867 on Mar. 28, 2017, which claims priority pursuant to 35 U.S.C. § 119(e) to U.S. Provisional Application No. 62/008,207, entitled "PRIORITIZING TASKS IN A STORAGE UNIT", filed Jun. 5, 2014, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10 is a logic diagram of an example of a method of establishing an operation execution schedule in accordance with the present invention.

DETAILED DESCRIPTION OF THE INVENTION

Figure 1:
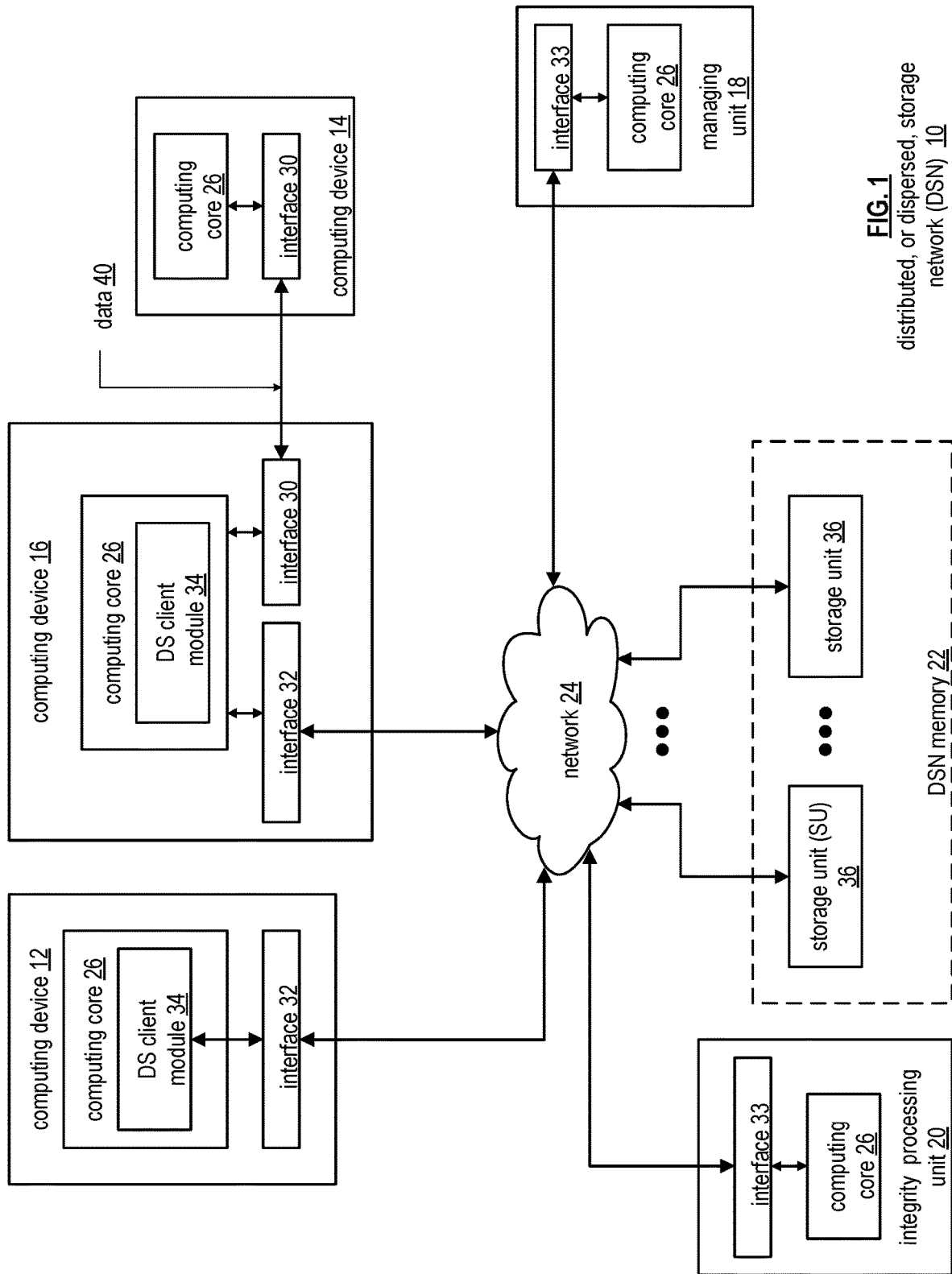
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
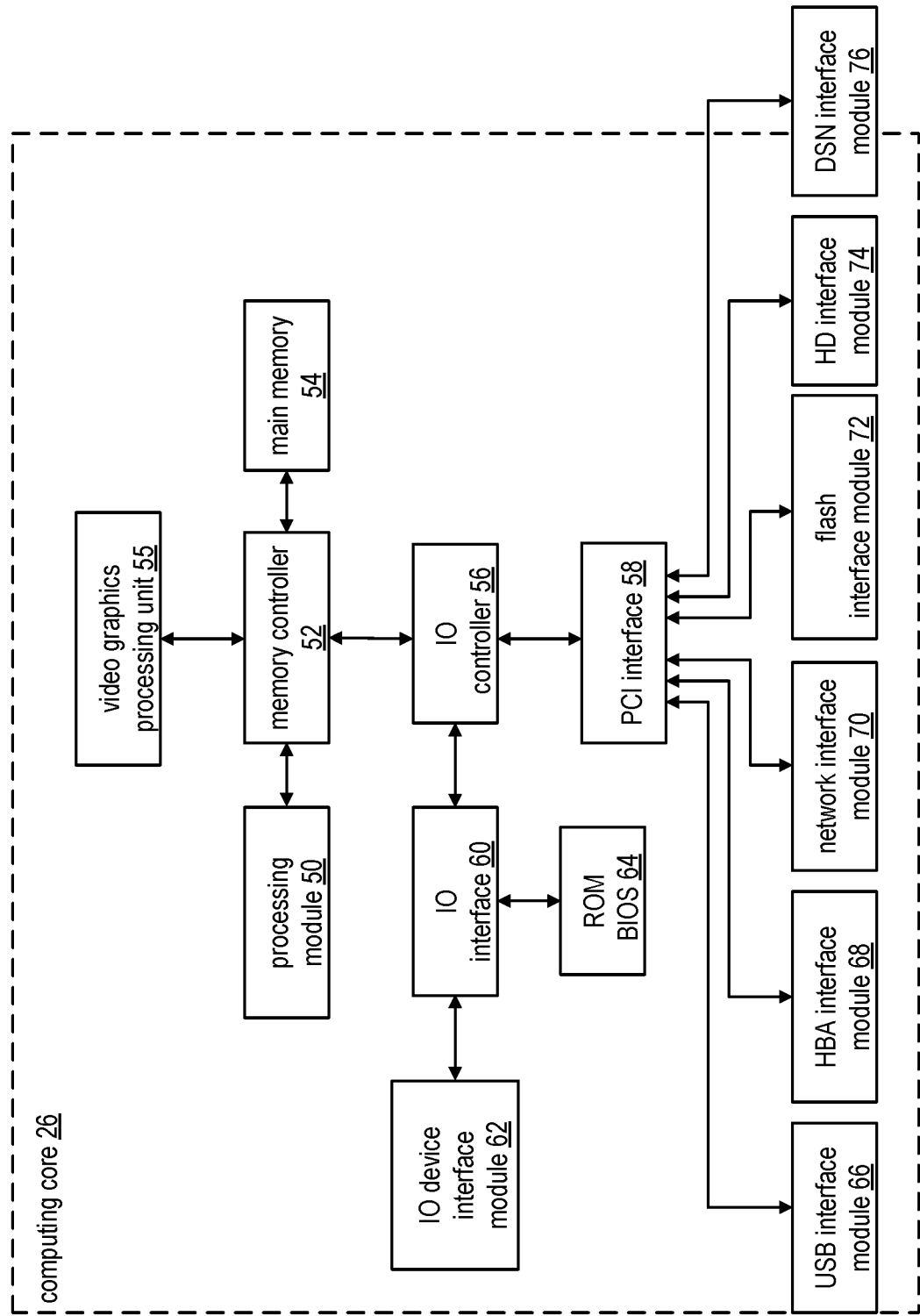
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
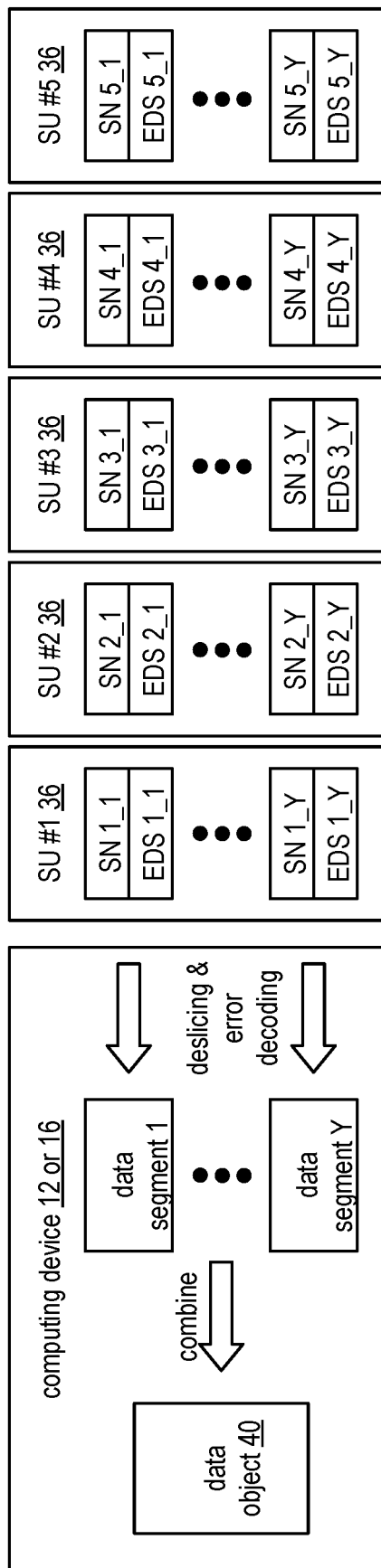
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
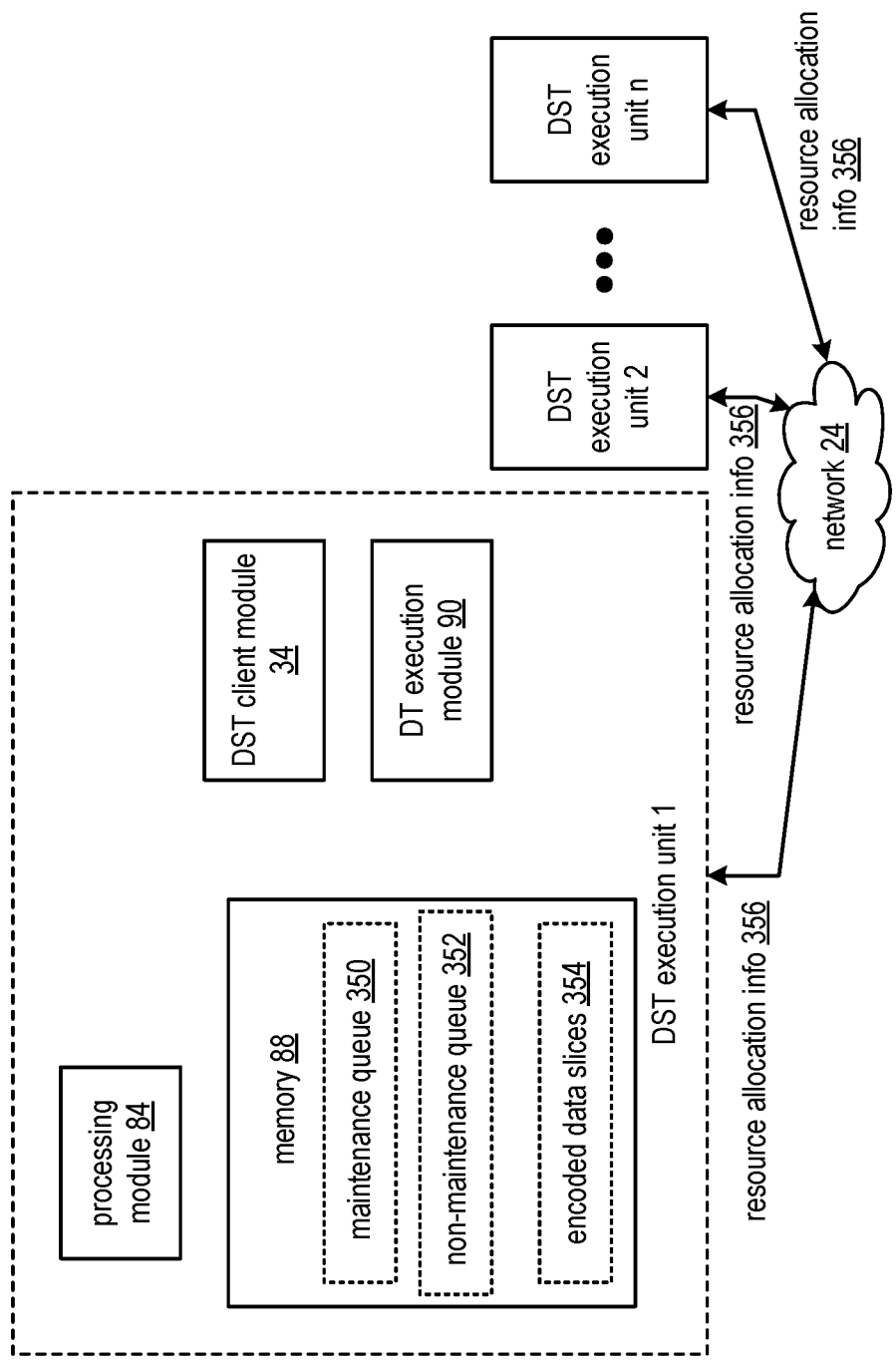
FIG. 9 is a schematic block diagram of an embodiment of a dispersed or distributed storage network (DSN) in accordance with the present invention.

FIG. 9 is a schematic block diagram of an embodiment of a dispersed storage network (DSN) that includes a set of distributed storage and task (DST) execution units 1-$n$ and the network 24 of FIG. 1. Alternatively, the DSN may include any number of DST execution units. Each DST execution unit may be implemented utilizing the storage unit 36 of FIG. 1. Each DST execution unit includes a processing module 84, memory 88, a DST client module 34 of FIG. 1, and/or a distributed task (DT) execution module 90. The processing module 84, the memory 88, and/or the DT execution module 90 can be implemented, for example, by utilizing the computing core 26 of FIG. 2. One or more portions of the memory 88 can be utilized for storage of a maintenance queue 350, a non-maintenance queue 352, and encoded data slices 354. For example, one or more of the encoded data slices 354 can be generated by performing a dispersed storage error encoding function on a data segment of a data object as discussed in conjunction with FIGS. 3-6. The DSN functions to establish an operation execution schedule for instructions for execution by the set of DST execution units. In particular, DST execution units can achieve this by pre-allocating resources in advance of an expensive operation.

There are many examples of operations in a DSN memory that are resource intensive. Such resource intensive operations include, for example, rebuilding, migration, transferring foster slices, and placing local redundancy. In each of these examples, at least two parties, such as two storage units, are involved. Often, such operations can be deferred to times of otherwise lessened activity, but since these examples involve multiple parties some negotiation is required to determine a time that is adequate for all of the involved parties. For this purpose, storage units may schedule and make appointments for these "maintenance type" operations, well into advance of the time they are first requested. For example, if a storage unit budgets 5% of its resources for such maintenance tasks, then any other entity which wishes to use some of its resources for maintenance tasks must indicate the number of expected resources required. The responding storage unit can then compute how long it will take given its resource budget, and can choose at least one time to schedule the operation. In the meantime, other scheduled operations can be completed. If a storage unit finds that its schedule ends up extending too far into the future, it can decide to allocate a larger fraction of its resources for servicing maintenance tasks, e.g. 10% instead of 5%. Storage units may report their schedules and allocations of resources as a general measure of health and how on top of tasks they are.

In an example of operation, the processing module 84 of each DST execution unit can identify at least one pending maintenance operation. Such maintenance operations can include rebuilding encoded data slices associated with storage errors, migrating encoded data slices, transferring encoded data slices, copying encoded data slices, and/or the DST client module 34 encoding encoded data slices to produce local redundancy slices. The identifying can include accessing the maintenance queue 350 of the memory 88, where the maintenance queue 350 includes instructions for execution associated with the maintenance operations.

Having identified the pending maintenance operations, the processing module 84 can identify pending non-maintenance operations. Such non-maintenance operations includes one or more of storing encoded data slices, retrieving encoded data slices, and the DT execution module 90 executing the partial tasks to produce partial results. The identifying can include accessing the non-maintenance queue 352 of the memory 88, where the non-maintenance queue 352 includes instructions for execution associated with the non-maintenance operations.

Having identified the pending non-maintenance operations, for a future timeframe, the processing module 84 can determine a resource availability level to support execution of at least some of the pending maintenance and non-maintenance operations. For example, the processing module obtains, via the network 24, resource allocation information 356 from two or more of the DST execution units of the set of DST execution units. The resource allocation information 356 can include one or more of available resources, a current operation execution schedule, a list of pending operations, and/or an estimate of required resources associated with execution of the pending operations.

Having determined the resource availability level, the processing module 84 can estimate a required resource level to execute at least some of the pending maintenance operations. For example, the processing module can estimate the required resource level for each type of pending operation based on one or more of historical execution records, an operation type, a predetermination, performing a test, and interpreting test results. Having estimated the required resource level to execute the at least some of the pending maintenance operations, the processing module 84 estimates a required resource level to execute at least some of the pending non-maintenance operations.

Having estimated the required resource levels, the processing module 84 can determine a balance factor to balance utilization of resources between the execution of pending maintenance operations and pending non-maintenance operations. The determining can be based on one or more of historical operation execution records, a priority level for the pending non-maintenance operations, and a number of pending maintenance operations. For example, the processing module 84 allocates a portion of an overall resource (e.g., time, number of modules) budget to execution of instructions associated with the maintenance queue in the non-maintenance queue. For instance, the processing module 84 allocates 15% of available resources for maintenance operations and a remaining 85% of available resources for non-maintenance operations.

Having determined the balance factor, the processing module 84 can coordinate determination of required timing of pending operation execution with one or more other DST execution units of the set of DST execution units. For example, the processing module 84 coordinates producing of partial results for a common partial task substantially the same time. As another example, the processing module 84 coordinates retrieval of the set of encoded data slices 354 at substantially the same time. As another example, the processing module 84 coordinates scheduling of the time frames with other DST execution units of a set of DST execution units that includes the DST execution unit to provide favorable coordinated execution of associated operations across the set of DST execution units. As yet another example, the processing module 84 coordinates scanning of the common DSN address range for storage errors by certain timeframe. Having coordinated the required timing, the processing module 84 updates an operation execution schedule based on one or more of the resource availability level, the required resource levels, the balance factor, and the required timing. For example, the processing module 84 coordinates with the at least one other DST execution unit to arrive at substantially similar time frames for initiation of execution of pending operations.

FIG. 10 is a flowchart illustrating an example of establishing an operation execution schedule in accordance the present invention. In particular, a method is presented for use in association with one or more functions and features described in conjunction with FIGS. 1-9, for execution by a dispersed storage and task (DST) execution unit that includes a processor or via processing module 84 or another processing system of a dispersed storage network that includes at least one processor and memory that stores instruction that configure the processor or processors to perform the steps described below.

The method begins or continues at step 358 where a processing module (e.g., of a distributed storage and task (DST) execution unit) identifies a plurality of pending operations. The identifying includes at least one of receiving an operation request, interpreting a list of pending operations, and searching for pending operations. The identifying may further include identifying a type of pending operation, e.g., maintenance, and non-maintenance.

The method continues at step 360, which includes determining a resource availability level, or a plurality of resource availability levels, to support execution of at least one of the plurality of pending operations. This can include, for example, identifying resources, interpreting an operation execution schedule associated with the identified resources, determining an execution capacity level for an identified resource, and/or measuring a loading level of an identified resource. The resource availability level can be determined for a future timeframe, for example, determined by the processing module. The step continues at 362, which includes determining a required resource level, or a plurality of required resource levels, to execute at least one of the plurality of pending operations. This can include, for example, determining an estimate for each type of pending operation and/or determining an estimate based on one or more of historical execution records, an operation type, a predetermination, and/or performing a test. In some embodiments, the method continues from step 362 to step 364. In other embodiments, step 362 can follow step 358 and precede step 360, and step 360 can continue to step 364.

In step 364, the processing module determines a balance factor between two or more types of the pending operations. The at least two types of pending operations can include a maintenance type and a non-maintenance type, and the at least one of the plurality of pending operations, corresponding to the resource availability level and/or the required resource level, can correspond to the maintenance type. The determining can be based on the resource availability level and/or the required resource level. The determining includes at least one of interpreting a goal, interpreting historical operation execution records, interpreting a priority level for an operation, identifying a number of pending maintenance operations, and identifying a current balance factor.

The method continues at step 366 where the processing module coordinates determining of required timing of the execution of the at least some of the pending operations with one or more other operation execution entities, such as at least one other DST execution unit. The coordinating includes one or more of identifying candidate operations requiring coordination, sending identifiers of the candidate operations to the one or more other operation execution entities (e.g., other storage units), estimating the required timing of the execution, and modifying the estimate of the required timing of execution based on received resource allocation information.

The method continues at step 368 where the processing module updates an operation execution schedule based on one or more of the required resource levels, the resource availability level, the balance factor, and/or the required timing of the execution. For example, the processing module modifies a previous operation scheduled to achieve execution of pending operations within a desired time frame utilizing available resources.

In various embodiments, a data segment was dispersed storage error encoded to produce a set of encoded data slices stored in a set of DST execution units that includes the DST execution unit, and where the at least one of the plurality of pending operations includes at least one of: rebuilding at least one of the set of encoded data slices or migrating at least one of the set of encoded data slices.

In various embodiments, the plurality of pending operations can include a set of non-maintenance operations corresponding to the non-maintenance type. The processing module can estimate a second required resource level to execute the set of non-maintenance operations, where the balance factor is further determined based on second required resource level.

In various embodiments, the balance factor is further determined based on a number a set of the plurality of pending operations corresponding to the maintenance type. The balance factor indicates a first proportion of available resources be allocated to pending operations corresponding to the maintenance type when the number corresponds to a first value, and the balance factor indicates a second proportion of available resources be allocated to pending operations corresponding to the maintenance type when the number corresponds to a second value. The first proportion can be larger than the second proportion as a result of the first value being greater than the second value.

In various embodiments, the balance factor is further determined based on a set of priority levels corresponding to the set of non-maintenance operations, and is further determined based at least one priority level corresponding to the at least one of the plurality of pending operations corresponding to the maintenance type. The balance factor can indicate a first proportion of available resources be allocated to pending operations of the non-maintenance type when a first average priority level of the set of priority levels is determined, and the balance factor indicates a second proportion of available resources be allocated to pending operations of the non-maintenance type when a second overall priority level of the set of priority levels is determined. The first proportion can is larger than the second proportion as a result of the first average priority level indicating a higher priority than the second overall priority level.

In various embodiments, resource allocation information is received from the at least one other DST execution unit, where the resource allocation information corresponds to resources of the at least one other DST execution unit. The resource availability level is determined based on the resource allocation information. The resource allocation information can include current operation execution schedule of the at least one other DST execution unit, a list of pending operations of the at least one other DST execution unit, and/or an estimate of required resources associated with execution of the plurality of pending operations of the at least one other DST execution unit.

In various embodiments, coordinating determination of required timing of the execution of the at least one of the plurality of pending operations with at least one other DST execution unit includes determining proposed required timing for the at least one of the plurality of pending operations based on the resource availability level, the required resource level, and the balance factor. the proposed required timing is transmitted to the at least one other DST execution unit. An updated proposed required timing is received from the at least one other DST execution unit that is different from the proposed required timing, where the required timing of the execution is determined to reflect the updated proposed required timing.

In various embodiments, the at least one of the plurality of pending operations includes execution of a partial task of a common task, where the common task includes additional partial tasks for execution by the at least one other DST execution unit. Coordinating determination of required timing of the execution can include coordinating execution of the partial task by the DST execution unit and execution of the additional partial tasks by the at least one other DST execution unit within a fixed timeframe.

In various embodiments, a request for resource allocation information is received by the processing module from at least one other DST execution unit or other execution entity, where the request indicates a future timeframe. The processing module can generate its own resource allocation information based on the operation execution schedule and the future timeframe, and can transmit the resource allocation information to the at least one other DST execution unit from which the request was received. The at least one other DST execution unit can update their own operation execution schedule, their own balance factor, and/or can coordinate their own required timing based on the resource allocation information received from the processing module.

In various embodiments, a non-transitory computer readable storage medium includes at least one memory section that stores operational instructions that, when executed by a processing system of a dispersed storage network (DSN) that includes a processor and a memory, causes the processing system to identify a plurality of pending operations. A resource availability level to support execution of at least one of the plurality of pending operations is determined, and a required resource level to execute the at least one of the plurality of pending operations is determined. A balance factor between at least two types of the plurality of pending operations is determined based on the resource availability level and the required resource level. Determination of required timing of the execution of the at least one of the plurality of pending operations is coordinated with at least one other DST execution unit. An operation execution schedule is updated based on the required resource levels, the resource availability level, the balance factor, and the required timing of the execution.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage unit that includes a processor, the method comprises:
   generating an operation execution schedule based on a required resource level to execute at least one of a plurality of pending operations, a resource availability level to support execution of the at least one of a plurality of pending operations, a balance factor between at least two types of the plurality of pending operations based on the resource availability level and the required resource level, and a required timing of the execution of the at least one of the plurality of pending operations;
   receiving a request for resource allocation information, wherein the request indicates a future timeframe;
   generating the resource allocation information based on the operation execution schedule and the future timeframe; and
   transmitting the resource allocation information.

2. The method of claim 1, wherein a data segment was dispersed storage error encoded to produce a set of encoded data slices stored in a set of storage units that includes the storage unit, and wherein the at least one of the plurality of pending operations includes at least one of: rebuilding at least one of the set of encoded data slices or migrating at least one of the set of encoded data slices.

3. The method of claim 1, wherein the at least two types of the plurality of pending operations includes a maintenance type and a non-maintenance type, and wherein the at least one of the plurality of pending operations correspond to the maintenance type.

4. The method of claim 3, wherein the plurality of pending operations includes a set of non-maintenance operations corresponding to the non-maintenance type, further comprising:
   estimating a second required resource level to execute the set of non-maintenance operations;
   wherein the balance factor is further determined based on second required resource level.

5. The method of claim 4, wherein the balance factor is further determined based on a number of the plurality of pending operations corresponding to the maintenance type, wherein the balance factor indicates a first proportion of available resources be allocated to pending operations corresponding to the maintenance type when the number corresponds to a first value, wherein the balance factor indicates a second proportion of available resources be allocated to pending operations corresponding to the maintenance type when the number corresponds to a second value, and wherein the first proportion is larger than the second proportion as a result of the first value being greater than the second value.

6. The method of claim 4, wherein the balance factor is further determined based on a set of priority levels corresponding to the set of non-maintenance operations, and is further determined based on at least one priority level corresponding to the at least one of the plurality of pending operations corresponding to the maintenance type.

7. The method of claim 6, wherein the balance factor indicates a first proportion of available resources be allocated to pending operations of the non-maintenance type when a first average priority level of the set of priority levels is determined, wherein the balance factor indicates a second proportion of available resources be allocated to pending operations of the non-maintenance type when a second overall priority level of the set of priority levels is determined, and wherein the first proportion is larger than the second proportion as a result of the first average priority level indicating a higher priority than the second overall priority level.

8. The method of claim 1, wherein the resource availability level is determined for a future timeframe.

9. The method of claim 1, further comprising receiving resource allocation, wherein the resource allocation information corresponds to resources of at least one other storage unit, and wherein the resource availability level is determined based on the resource allocation information.

10. The method of claim 9, wherein the resource allocation information includes a current operation execution schedule of the at least one other storage unit, a list of pending operations of the at least one other storage unit, and an estimate of required resources associated with execution of the plurality of pending operations of the at least one other storage unit.

11. The method of claim 1, wherein coordinating determination of required timing of the execution of the at least one of the plurality of pending operations with at least one other storage unit includes:
   determining proposed required timing for the at least one of the plurality of pending operations based on the resource availability level, the required resource level, and the balance factor;
   transmitting the proposed required timing to the at least one other storage unit; and
   receiving an updated proposed required timing from the at least one other storage unit that is different from the proposed required timing, wherein the required timing of the execution is determined to reflect the updated proposed required timing.

12. The method of claim 1, wherein the at least one of the plurality of pending operations includes execution of a partial task of a common task, wherein the common task includes additional partial tasks for execution by at least one other storage unit.

13. The method of claim 12, wherein coordinating determination of required timing of the execution includes coordinating execution of the partial task by the storage unit and execution of the additional partial tasks by the at least one other storage unit within a fixed timeframe.

14. A processing system of a storage unit comprises:
   at least one processor;
   a memory that stores operational instructions, that when executed by the at least one processor cause the processing system to perform operations that include:
      generating an operation execution schedule based on a required resource level to execute at least one of a plurality of pending operations, a resource availability level to support execution of the at least one of a plurality of pending operations, a balance factor between at least two types of the plurality of pending operations based on the resource availability level and the required resource level, and a required timing of the execution of the at least one of the plurality of pending operations;
      receiving a request for resource allocation information, wherein the request indicates a future timeframe;
      generating the resource allocation information based on the operation execution schedule and the future timeframe; and
      transmitting the resource allocation information.

15. The processing system of claim 14, wherein a data segment was dispersed storage error encoded to produce a set of encoded data slices stored in a set of storage units that includes the storage unit, and wherein the at least one of the plurality of pending operations includes at least one of: rebuilding at least one of the set of encoded data slices or migrating at least one of the set of encoded data slices.

16. The processing system of claim 14, wherein the at least two types of the plurality of pending operations includes a maintenance type and a non-maintenance type, and wherein the at least one of the plurality of pending operations correspond to the maintenance type.

17. The processing system of claim 14, further comprising receiving resource allocation information from at least one other storage unit, wherein the resource allocation information corresponds to resources of the at least one other storage unit, and wherein the resource availability level is determined based on the resource allocation information.

18. The processing system of claim 14, wherein coordinating determination of required timing of the execution of the at least one of the plurality of pending operations with at least one other storage unit includes:
    determining proposed required timing for the at least one of the plurality of pending operations based on the resource availability level, the required resource level, and the balance factor;
    transmitting the proposed required timing to the at least one other storage unit.

19. The processing system of claim 18, wherein coordinating determination of required timing of the execution of the at least one of the plurality of pending operations with at least one other storage unit further includes:
    receiving an updated proposed required timing from the at least one other storage unit that is different from the proposed required timing, wherein the required timing of the execution is determined to reflect the updated proposed required timing.

20. A tangible machine-readable storage medium comprises:
    at least one memory section that stores operational instructions that, when executed by a processing system of a dispersed storage network (DSN) that includes a processor and a memory, causes the processing system to perform operations that include:
        generating an operation execution schedule based on a required resource level to execute at least one of a plurality of pending operations, a resource availability level to support execution of the at least one of a plurality of pending operations, a balance factor between at least two types of the plurality of pending operations based on the resource availability level and the required resource level, and a required timing of the execution of the at least one of the plurality of pending operations;
        receiving a request for resource allocation information, wherein the request indicates a future timeframe;
        generating the resource allocation information based on the operation execution schedule and the future timeframe; and
        transmitting the resource allocation information.

* * * * *